United States Patent
Kim et al.

(10) Patent No.: US 11,112,559 B2
(45) Date of Patent: Sep. 7, 2021

(54) METHOD OF FABRICATING LIGHT GUIDE PLATE, LIGHT GUIDE PLATE FABRICATED THEREBY, AND ILLUMINATION DEVICE HAVING THE SAME

(71) Applicant: CORNING INCORPORATED, Corning, NY (US)

(72) Inventors: Euisoo Kim, Seongnam-si (KR); Seong-ryong Ryoo, Chungcheongnam-do (KR); Gun-sang Yoon, Hwaseong-si (KR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/374,381

(22) Filed: Apr. 3, 2019

(65) Prior Publication Data
US 2020/0103583 A1    Apr. 2, 2020

(30) Foreign Application Priority Data

Oct. 1, 2018   (KR) .................. 10-2018-0116835
Nov. 29, 2018  (KR) .................. 10-2018-0150797

(51) Int. Cl.
F21V 8/00    (2006.01)

(52) U.S. Cl.
CPC ......... *G02B 6/0088* (2013.01); *G02B 6/0031* (2013.01); *G02B 6/0043* (2013.01);
(Continued)

(58) Field of Classification Search
CPC .. G02B 6/0043; G02B 6/0051; G02B 6/0058; G02B 6/0065; G02B 6/0088; G02B 6/0095; B60Q 3/208
See application file for complete search history.

(56) References Cited

U.S. PATENT DOCUMENTS 5,881,201 A * 3/1999 Khanarian ........... G02B 6/0041
                                                    385/146
5,899,552 A * 5/1999 Yokoyama .......... G02B 6/0038
                                                    349/62
(Continued)

FOREIGN PATENT DOCUMENTS

JP    1996160417 A    6/1996
JP    3579849 B2     10/2004
(Continued)

OTHER PUBLICATIONS

Yang, Transparent light guide plate and transparent display apparatus having the same, Oct. 16, 2017, Patent Pub. KR20170114425A, Espacenet, https://worldwide.espacenet.com/patent/search/family/060295842/publication/KR20170114425A?q=pn%3DKR20170114425A (Year: 2017).*

(Continued)

*Primary Examiner* — Rajarshi Chakraborty
*Assistant Examiner* — Michael Chiang

(57) ABSTRACT

A method of fabricating a light guide plate (LGP), an LGP fabricated thereby, and an illumination device having the same. The method includes preparing an LGP and fabricating a light-scattering layer by printing a printing solution including light-scattering particles on an overall bottom surface of the LGP. The light-scattering layer may be fabricated by at least one of a first method of controlling the printing such that the density of the light-scattering particles gradually increases with increases in a distance from the light-emitting diode facing a side surface of the LGP and a second method of controlling the printing such that the thickness of the light-scattering layer gradually increases with increases in the distance from the light-emitting diode. A luminous point through can be prevented from being viewed by a front observer, a process can be simplified, and (Continued)

light distribution similar to Lambertian distribution can be obtained.

20 Claims, 5 Drawing Sheets

(52) U.S. Cl.
CPC ......... *G02B 6/0051* (2013.01); *G02B 6/0055* (2013.01); *G02B 6/0065* (2013.01); *G02B 6/0073* (2013.01)

(56) References Cited

U.S. PATENT DOCUMENTS

| | | | | |
|---|---|---|---|---|
| 6,206,535 B1* | 3/2001 | Hattori | ................ | G02B 6/0041 362/23.16 |
| 7,105,222 B2* | 9/2006 | Marzolin | ............ | G02B 5/0226 428/323 |
| 9,563,006 B2* | 2/2017 | Ballard | ................ | G02B 6/0055 |
| 2005/0069254 A1* | 3/2005 | Schultheis | ........... | G02B 6/0043 385/31 |
| 2005/0105303 A1* | 5/2005 | Emde | ................ | B32B 17/10045 362/616 |
| 2009/0103327 A1* | 4/2009 | Iwasaki | ................ | G02B 6/0041 362/617 |
| 2011/0103095 A1 | 5/2011 | Ozaki et al. | | |
| 2011/0194305 A1 | 8/2011 | Chen et al. | | |
| 2015/0070935 A1* | 3/2015 | Iwasaki | ................ | G02B 6/0011 362/617 |
| 2015/0330597 A2* | 11/2015 | Schaffer | ................ | B82Y 30/00 362/603 |
| 2016/0291236 A1* | 10/2016 | Baker | ................ | G02B 6/0065 |
| 2016/0377796 A1* | 12/2016 | Sherman | ............ | G02B 6/0065 40/541 |
| 2017/0205701 A1* | 7/2017 | Ide | ........ | G02B 5/0278 |
| 2017/0319726 A1 | 11/2017 | Kim | | |
| 2018/0074251 A1 | 3/2018 | Berard et al. | | |
| 2019/0009507 A1* | 1/2019 | Suzuki | ................ | B32B 7/02 |

FOREIGN PATENT DOCUMENTS

| | | |
|---|---|---|
| JP | 4835790 B2 | 12/2011 |
| JP | 2018067369 A | 4/2018 |
| KR | 100656896 B1 | 12/2006 |
| KR | 20120032916 A | 4/2012 |
| KR | 1715893 B1 | 3/2017 |
| KR | 20170114425 A * | 10/2017 |
| KR | 1020170114425 A | 10/2017 |

OTHER PUBLICATIONS

International Search Report and Written Opinion of the European International Searching Authority; PCT/US2019/053724; dated Jan. 17, 2020; 12 pgs.

* cited by examiner (a) LED on (b) LED off

PRIOR ART

METHOD OF FABRICATING LIGHT GUIDE PLATE, LIGHT GUIDE PLATE FABRICATED THEREBY, AND ILLUMINATION DEVICE HAVING THE SAME

BACKGROUND

Field

This application claims the benefit of priority under 35 U.S.C. § 119 of Korean Patent Application Serial No. 2018-0150797 filed on Nov. 29, 2018 and Korean Patent Application Serial No. 2017-0116835 filed on Oct. 1, 2018, the content of each are relied upon and incorporated herein by reference in their entirety.

The present disclosure relates to a method of fabricating a light guide plate (LGP), an LGP fabricated thereby, and an illumination device having the same and, more particularly, to a method of fabricating an LGP, an LGP fabricated thereby, and an illumination device having the same, in which a luminous point through which light is extracted can be prevented from being viewed by a front observer, a process can be simplified, and light distribution similar to Lambertian distribution can be obtained.

Description of Related Art

In general, a light guide plate (LGP) is implemented using a high transparency substrate of, for example, an acrylic or polycarbonate. The LGP distributes light therein using total internal reflection that occurs when light travels from a medium having a higher optical refractive index to a medium having a lower optical refractive index. When light traveling within the LGP strikes a light extraction point (or site), the light is refracted and exits the LGP. In this regard, the LGP must have a plurality of light extraction points, at which light is extracted outwardly. Such light extraction points are generally manufactured by a method of machining V-shaped grooves in the LGP, a method of fabricating lenses using inkjets, and as illustrated in FIG. 10, a method of printing patterned dots 5 on the surface of an LGP 3 by screen printing. However, in the case of printing the patterned dots 5 on the surface of the LGP 3, a diffuser sheet must be additionally provided, due to significant distances between the dots 5.

As illustrated in FIG. 11, in response to the development of inkjet technology, printing of smaller dots 5 has recently been enabled. When the minute dots 5 are randomly arranged to function like a diffuser sheet, the diffuser sheet can be omitted. However, when this structure is used in an actual illumination device, the dots 5 fabricated by inkjet printing may be visually recognized, even if the size thereof is reduced. In particular, stains or the like may be produced due to process variations. This structure may be somewhat incomplete for use in an actual product.

In addition, since the number of the dots 5 to be printed increases with decreases in the size of the dots 5, mass production thereof may require an extended amount of time, which is also problematic.

RELATED ART DOCUMENT

Patent Document 1: Korean Patent No. 10-0656896 (Dec. 6, 2006)

SUMMARY

Various aspects of the present disclosure provide a method of fabricating a light guide plate (LGP), an LGP fabricated thereby, and an illumination device having the same, in which a luminous point through which light is extracted can be prevented from being viewed by a front observer, a process can be simplified, and light distribution similar to Lambertian distribution can be obtained.

According to an aspect, a method of fabricating a light guide plate used in an edge-lit illumination device may include: preparing a light guide plate including a first surface facing a front observer and through which light is irradiated, a second surface opposite to the first surface, and a third surface connected to a peripheral portion of the first surface and a peripheral portion of the second surface to connect the first surface and the second surface, the third surface facing a light-emitting diode; and fabricating a light-scattering layer by printing a printing solution including light-scattering particles on an overall area of the second surface. The light-scattering layer may be fabricated by at least one of a first method of controlling the printing such that a density of the light-scattering particles gradually increases with increases in a distance from the light-emitting diode facing at least one surface of the third surface and a second method of controlling the printing such that a thickness of the light-scattering layer gradually increases with increases in the distance from the light-emitting diode facing at least one surface of the third surface.

Here, the method may further include manufacturing the printing solution before fabricating the light-scattering layer.

The printing solution may be manufactured by adding the light-scattering particles to the printing solution, such that an amount of the light-scattering particles ranges, by weight, from 0.1% to 5% of an amount of the printing solution.

The printing solution may be manufactured by adding the light-scattering particles to the printing solution, the light-scattering particles including at least one selected from among $TiO_2$, $ZrO_2$, $BaTiO_3$, and $SnO_2$.

The first method may control the printing such that numbers of the light-scattering particles per unit area vary by at least 1.2 times according to positions.

The first method may control the printing such that the light-scattering layer is formed to have a uniform thickness on the overall area of the second surface.

The second method may control the printing such that the thickness of the light-scattering layer according to positions ranges from 1 μm to 5 μm.

The method may further include curing the light-scattering layer after fabricating the light-scattering layer.

According to another aspect, a light guide plate may include: a light guide plate body including a first surface facing a front observer and through which light is irradiated, a second surface opposite to the first surface, and a third surface connected to a peripheral portion of the first surface and a peripheral portion of the second surface to connect the first surface and the second surface, the third surface facing a light-emitting diode; and a light-scattering layer fabricated on an overall area of the second surface, the light-scattering layer including a matrix layer and a number of light-scattering particles dispersed in the matrix layer. The thickness of the light-scattering layer may gradually increase with increases in a distance from the light-emitting diode facing at least one surface of the third surface.

According to a further aspect, a light guide plate may include: a light guide plate body including a first surface facing a front observer and through which light is irradiated, a second surface opposite to the first surface, and a third surface connected to a peripheral portion of the first surface and a peripheral portion of the second surface to connect the first surface and the second surface, the third surface facing a light-emitting diode; and a light-scattering layer fabricated on an overall area of the second surface, the light-scattering layer including a matrix layer and a number of light-scattering particles dispersed in the matrix layer. The dispersion density of the number of light-scattering particles may gradually increase with increases in a distance from the light-emitting diode facing at least one surface of the third surface.

Here, the light-scattering layer may be fabricated at a uniform thickness on an overall area of the second surface.

The surface of the light-scattering layer may be a flat surface.

The surface roughness of the light-scattering layer may be 100 nm or less.

The thickness of the light-scattering layer according to positions ranges from 1 μm to 5 μm.

The light-scattering particles may be formed from a material having a higher refractive index than that of the matrix layer.

The light-scattering particles may be formed from at least one selected from among $TiO_2$, $ZrO_2$, $BaTiO_3$, and $SnO_2$.

The light guide plate may have a hazing value of 30% or less and a transmittance of 50% or more.

According to a further aspect, an illumination device may include: the above-described light guide plate; at least one light-emitting diode disposed to face at least one surface of the third surface defined as a side surface of the light guide plate; and a frame providing a space in which the light guide plate and the light-emitting diode are disposed.

When the light-emitting diode is on, light may be irradiated through the first surface defined as a front surface of the light guide plate and the second surface defined as a rear surface of the light guide plate. When the light-emitting diode is off, the front observer facing the first surface can observe the second surface through the light guide plate.

The illumination device may further include a reflector disposed adjacent to the second surface defined as a rear surface of the light guide plate.

As set forth above, according to the present disclosure, the light-scattering layer including the light-scattering particles is fabricated on the overall area of the rear surface of the LGP, with respect to a front observer, in a single printing process. This can accordingly prevent the phenomenon in which luminous points through which light is extracted are visible to a front observer, i.e. the problem in which stains occurring in inkjet printing in the related art, due to pattern mismatch or regularly patterned shapes, are visible to a front observer.

In addition, according to the present disclosure, the light-scattering layer can be fabricated in a single printing process, the diffuser sheet disposed in front of the LGP can be omitted, and an additional layer, such as a low surface energy layer required in the case of fabrication of lenses, may be unnecessary, thereby simplifying the LGP fabrication process.

Furthermore, according to the present disclosure, the density of the light-scattering particles with respect to the printing solution is controlled to gradually increase with increases in the distance from the LED disposed on the side surface of the LGP or the thickness of the light-scattering particles is controlled to gradually increase with increases in the distance from the LED disposed on the side surface of the LGP. This can consequently prevent the problem of an excessive quantity of light from exiting areas adjacent to the LED and obtain light distribution similar to Lambertian distribution.

In addition, according to the present disclosure, the illumination device may be provided as a transparent illumination device. That is, when the LED is on, light can be irradiated through both the front and rear surfaces of the LGP, and when the LED is off, any object behind the illumination device is visible to a front observer.

The methods and apparatuses of the present disclosure have other features and advantages that will be apparent from or that are set forth in greater detail in the accompanying drawings which are incorporated herein, and in the following Detailed Description, which together serve to explain certain principles of the present disclosure.

DETAILED DESCRIPTION

Hereinafter a method of fabricating a light guide plate (LGP), an LGP fabricated thereby, and an illumination device having the same will be described in detail with reference to the accompanying drawings.

In the following description, detailed descriptions of known functions and components incorporated in the present disclosure will be omitted in the case in which the subject matter of the present disclosure is rendered unclear by the inclusion thereof.

Figure 1:
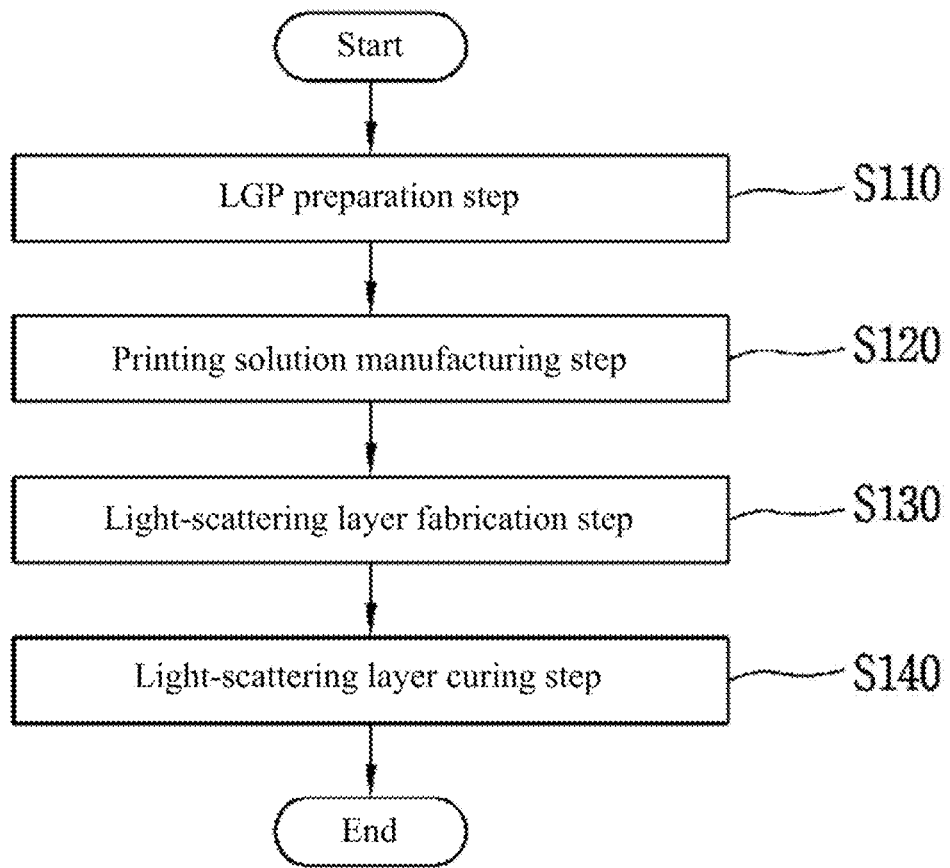
FIG. 1 is a process flowchart illustrating a method of fabricating an LGP according to an exemplary embodiment.
Figure 2:
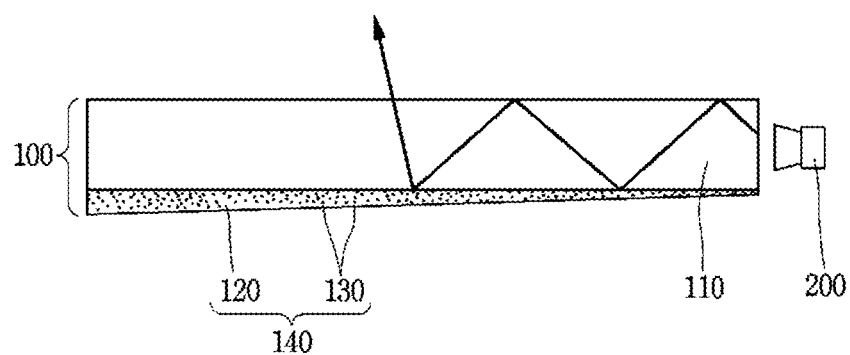
FIG. 2 is a conceptual diagram schematically illustrating an LGP fabricated according to an exemplary embodiment.

As illustrated in FIGS. 1 and 2, the method of fabricating an LGP according to an exemplary embodiment is a method of fabricating an LGP 100 used in an edge-lit illumination device 10 (see FIGS. 3 and 4) that is lit by light-emitting diodes (LEDs) disposed on an edge thereof.

In this regard, the method of fabricating a LGP according to an exemplary embodiment includes a LGP preparation step S110 and a light-scattering layer fabrication step S130. The method of fabricating a LGP according to an exemplary embodiment may further include a printing solution manufacturing step S120 before the light-scattering layer fabrication step S130.

First, in the LGP preparation step S110, an LGP 100 is prepared as a transparent plate. For example, the LGP 100 may be implemented using a substrate formed from an acrylic or glass. When the LGP 100 is implemented using a transparent substrate, a transparent LED illumination device may be provided, so that an image behind the device is visible. In this regard, the LGP 100 may have a hazing value of 30% or lower and a transmittance of 50% or higher. According to the exemplary embodiment, a surface of the LGP 100, facing a front observer, and through which light is irradiated, will be referred to as a "front surface," a surface of the LGP 100 opposite to the front surface will be referred to as a "rear surface," and surfaces of the LGP 100 connected to peripheries of the front surface and peripheries of the rear surface to connect the front surface and the rear surface will be referred to as side surfaces of the LGP 100.

Afterwards, in the printing solution manufacturing step S120, a printing solution including light-scattering particles 130 is manufactured. Here, according to the exemplary embodiment, the content of the light-scattering particles 130 in the printing solution is required to be very small, when compared to a dot pattern printing solution of the related art. When a light-scattering layer 140 is fabricated in the light-scattering layer fabrication step S130, to be described later, the light-scattering layer 140 provides a surface, instead of forming dot shapes of the related art, thereby increasing the overall area. Accordingly, a large quantity of light exits the areas adjacent to the LED 200. To overcome this problem, the content of the light-scattering particles 130 is set to be very small, when compared to the dot pattern printing solution of the related art.

In this regard, in the printing solution manufacturing step S120, the light-scattering particles 130 may be added to the printing solution such that the content thereof with respect to the printing solution may range, by weight, from 0.1% to 5%, and preferably, may be 2% or less.

Here, according to the exemplary embodiment, the light-scattering particles 130 may be implemented using a material having a different refractive index from that of the material of the printing solution, and particularly, a higher refractive index than that of the material of the printing solution. For example, in the printing solution manufacturing step S120, the light-scattering particles 130 added to the printing solution may be at least one selected from among, but not limited to, $TiO_2$, $ZrO_2$, $BaTiO_3$, and $SnO_2$. However, this is merely an example and the light-scattering particles 130 are not limited to the above-mentioned materials. Rather, the light-scattering particles 130 may be implemented using a variety of other materials having a higher refractive index than that of the material of the printing solution. Here, when $BaTiO_3$ is selected to be used as the light-scattering particles 130, a mixture solution of polysiloxane and dipropylene glycol methyl ether (DPM) may be used as the printing solution. However, this is merely an example, and the printing solution is not limited to the above-mentioned mixture solution.

For example, when $TiO_2$ is selected to be used as the light-scattering particles 130, a mixture of hexamethylene diacrylate, exo-1,7,7-trimethylbicyclo[2.2.1]hept-2-yl acrylate, benzyl acrylate, 2-methoxyethyl acrylate, and diphenyl (2,4,6-trimethylbenzoyl) phosphine oxide may be used as the printing solution.

Afterwards, in the light-scattering layer fabrication step S130, the printing solution is printed on the overall area of the rear surface of the LGP 100, thereby forming a continuous light-scattering layer 140, with the light-scattering particles 130 being dispersed therein. When the printing solution, including the light-scattering particles 130 having a significantly low content, is printed on the overall area of the rear surface of the LGP 100, as described above, the surface of the light-scattering layer 140 forms a flat surface. That is, none of the light-scattering particles 130 protrude from the surface of light-scattering layer 140. For example, a surface roughness (Ra) of 100 nm or less was measured from a 10 μm×10 μm area of the surface of the light-scattering layer 140 using an atomic force microscope (AFM), in a luminous condition in which diffuse reflection occurs on the surface of the light-scattering layer 140. The light-scattering particles 130 only dispersed within the scattering layer 140, as described above, can prevent the phenomenon in which luminous points through which light is extracted are visible to a front observer, i.e. the problem in which stains occurring in inkjet printing in the related art, due to pattern mismatch or regularly patterned shapes, are visible to a front observer.

In addition, since the light-scattering layer 140 is fabricated to form a single surface covering the overall area of the rear surface of the LGP 100, instead of being fabricated as dot-patterned spots of the related art, a diffuser sheet disposed in front of the LGP in the related art can be omitted and an additional layer, such as a low surface energy layer required in the case of fabrication of lenses, may be unnecessary, thereby simplifying an LGP fabrication process. In addition, in the light-scattering layer fabrication step S130 according to the exemplary embodiment, the light-scattering layer 140 can be fabricated in a single printing process, thereby simplifying the fabrication process.

In addition, the light-scattering layer fabrication step S130 according to the exemplary embodiment uses at least one of a first method of controlling the printing process such that the content of light-scattering particles 130 in the light-scattering layer 140 varies in a position-specific manner, depending on the distance from the LED 200 facing at least one surface of the side surfaces of the LGP 100, and a second method of controlling the printing process such that the thickness of the light-scattering layer 140 varies in a position-specific manner, depending on the distance from the LED 200 facing at least one surface of the side surfaces of the LGP 100. This feature is intended to adjust the difference of light extraction efficiency depending on the distance from the LED 200 disposed on the side surface of the LGP 100. That is, the printing process is controlled as described above, since it is necessary to decrease the light extraction efficiency in an area closer to the LED 200 while increasing the light extraction efficiency in an area located farthest from the LED 200 in order to realize uniform light distribution across the entirety of areas.

Specifically, the first method used in the light-scattering layer fabrication step S130 may control the printing process such that the density of the light-scattering particles per unit area, with respect to the printing solution, gradually increases with increases in the distance from the LED 200 facing at least one surface of the side surfaces of the side surfaces of the LGP 100. For example, in the light-scattering layer fabrication step S130, the printing process may be controlled such that the numbers of the light-scattering particles 130 per unit area vary by at least 1.2 times according to positions. For example, the printing process may be controlled such that the number of the light-scattering particles 130 dispersed within a portion of the light-scattering layer 140, located adjacently to the LED 200, is 50% while the number of the light-scattering particles 130 dispersed within a portion of the light-scattering layer 140, located farthest from the LED 200, is 80%. Here, in the first method, the printing process may be controlled such that the thickness of the light-scattering layer 140 is uniform across the overall area of the rear surface of the LGP 100. For example, in the first method, two solutions including the light-scattering particles formed from $BaTiO_3$, i.e. a solution in which the weight ratio of the light-scattering particles is 0.5% and a solution in which the weight ratio of the light-scattering particles is 1.2%, are prepared. Afterwards, an inkjet head, able to use both of the two solutions, is prepared. In subsequence, a light-scattering layer is printed at a uniform thickness using the inkjet head, such that the numbers of the light-scattering particles per unit volume vary according to the positions. In this case, the light-scattering layer having the uniform printing thickness and different numbers of light-scattering particles per unit volume can be printed and fabricated by continuously changing the ratios of injection of the two solutions while maintaining the entire printing density fixed.

In addition, the second method used in the light-scattering layer fabrication step S130 may control the printing process such that the thickness of the light-scattering layer 140 gradually increases with increases in the distance from the LED 200 facing at least one surface of the side surfaces of the LGP 100. For example, in the second method used in the light-scattering layer fabrication step S130, the printing process may be controlled such that the thickness of the light-scattering layer 140 ranges from 1 μm to 5 μm according to positions. That is, in the light-scattering layer fabrication step S130, the printing process may be controlled such that the thickness of a portion of the light-scattering layer 140, located adjacently to the LED 200, is 1 while the thickness of a portion of the light-scattering layer 140, located farthest from the LED 200, is 5 Here, in the light-scattering layer fabrication step S130, the printing process may be controlled such that the thickness of the portion of the light-scattering layer 140, located adjacently to the LED 200, is 1 and then the thickness of the light-scattering layer 140 gradually increases, for example, in the form of a Gaussian distribution curve, so that the thickness of the portion of the light-scattering layer 140, located farthest from the LED 200, is finally 5 μm. Here, when the thickness of the light-scattering layer 140 is less than 1 light distribution similar to similar to Lambertian distribution cannot be obtained. When the thickness of the light-scattering layer 140 exceeds 5 it is difficult to dry the printed light-scattering layer 140, which is problematic.

Although the LED 200 has been described as only being disposed on a single side surface of the LGP 100 according to the exemplary embodiment, the LED 200 may be disposed on opposite side surfaces of the LGP 100. In this case, the light-scattering layer 140 may be fabricated such that the thickness of a portion thereof, located in a central portion of the LGP 100, is the greatest. That is, the thickest portion of the light-scattering layer 140, the thickness of which is 5 may be provided on the central area of the LGP 100.

Figure 8A:
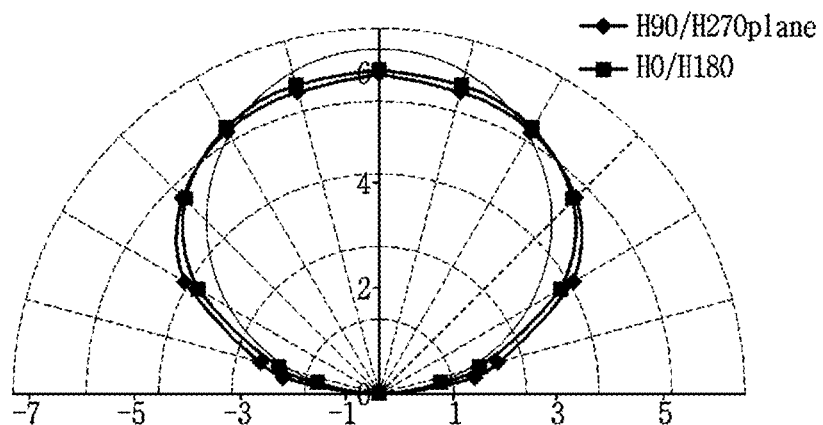
FIGS. 8A and 8B are a light distribution diagram of an LGP fabricated by Example 1 of the present disclosure.
Figure 8B:
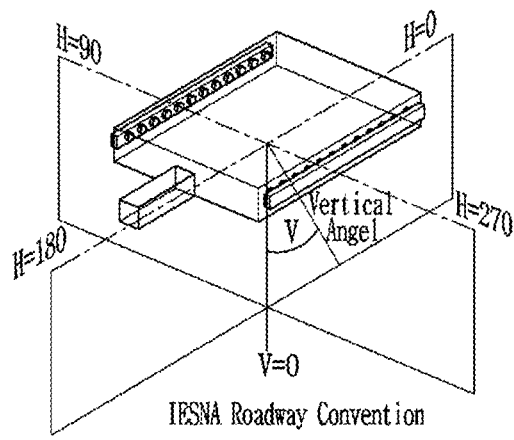

As described above, in the light-scattering layer fabrication step S130, the density of the light-scattering particles 130 with respect to the printing solution may be controlled so as to gradually increase with increases in the distance from the LED 200 facing at least one surface of the side surfaces of the LGP 100, the thickness of the light-scattering particles 130 may be controlled so as to gradually increase in the form of a Gaussian distribution curve, or the thickness of the light-scattering particles 130 may be controlled so as to gradually increase while the density of the light-scattering particles 130 with respect to the printing solution is controlled so as to gradually increase with increases in the distance from the LED 200 facing at least one surface of the side surfaces of the LGP 100. This can consequently prevent the problem of an excessive quantity of light from exiting the areas adjacent to the LED 200, and obtain light distribution (see FIG. 8) similar to Lambertian distribution.

Finally, the method of fabricating a LGP according to the exemplary embodiment may further include a light-scattering layer curing step S140 of curing the light-scattering layer 140 fabricated on the overall area of the rear surface of the LGP 100 in the light-scattering layer fabrication step S130. In the light-scattering layer curing step S140, the light-scattering layer 140 may be cured using an inline ultraviolet (UV) ray curing device.

As illustrated in FIG. 2, when the light-scattering layer curing step S140 is completed, the LGP 100 according to the exemplary embodiment is fabricated. That is, the LGP 100 according to the exemplary embodiment includes an LGP body 110, with the LED 200 being disposed adjacently a side surface thereof and the light-scattering layer 140 fabricated on the overall area of the rear surface of the LGP body 110. Here, the light-scattering layer 140 includes a matrix layer 120 and the number of light-scattering particles 130 dispersed in the matrix layer 120.

According to the exemplary embodiment, the surface of the light-scattering layer 140 forms a flat surface, with a surface roughness (Ra) thereof being, for example, 100 nm or less. The thickness of the light-scattering layer 140 gradually increases in the form of a Gaussian distribution curve, with increases in the distance from the side surface of the LGP 100 on which the LED 200 is disposed. The thickness of the portion of the light-scattering layer 140, most adjacent to the LED 200, may be the smallest thickness of 1 μm, whereas the thickness of the portion of the light-scattering layer 140, located farthest from the LED 200, may be the smallest thickness of 5 μm.

In addition, the dispersion density of the number of light-scattering particles 130 may gradually increase, with increases in the distance from the side surface of the LGP 100 on which the LED 200 is disposed. Here, the light-scattering particles 130 may be formed from a material, the refractive index of which is higher than that of the material of the light-scattering layer 140. For example, the light-scattering particles 130 may be formed from at least one selected from among, but not limited to, $TiO_2$, $ZrO_2$, $BaTiO_3$, and $SnO_2$.

When the dispersion density of the light-scattering particles 130 gradually increases, with increases in the distance from the side surface of the LGP 100 on which the LED 200 is disposed, as described above, the light-scattering layer 140 may be fabricated at a uniform thickness across the overall area of the rear surface of the LGP 100.

Figure 3:
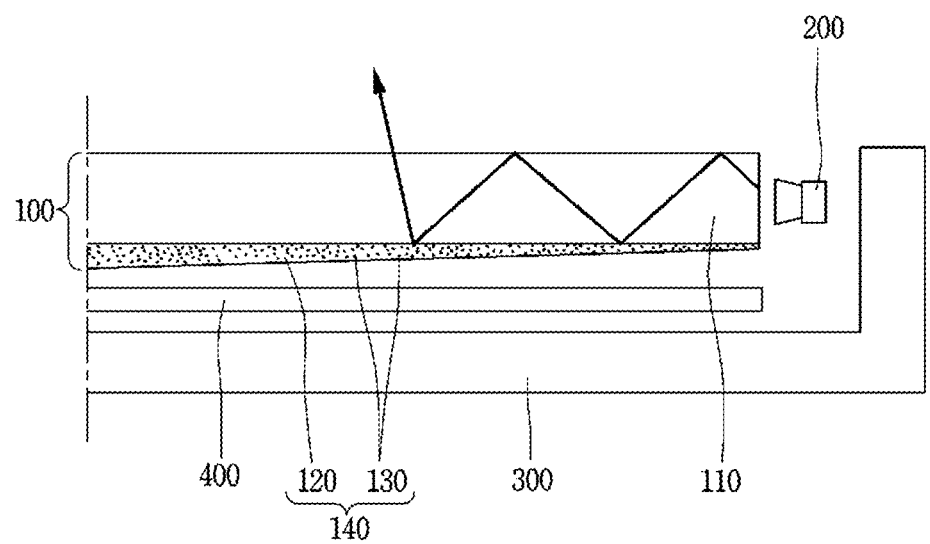
FIGS. 3 and 4 are conceptual diagrams schematically illustrating an illumination device including an LGP fabricated according to an exemplary embodiment.

As illustrated in FIG. 3, the LGP 100 fabricated by the method of fabricating an LGP according to an exemplary embodiment, as described above, may be used in an illumination device 10.

The illumination device 10 according to an exemplary embodiment is an edge-lit illumination device, including the LGP 100 and the LED 200, as described above, and a frame 300.

The LED 200 is disposed on at least one side surface of the LGP 100. That is, the LED 200 may be disposed on the left side surface, the right side surface, or both the left and right side surfaces of the LGP 100, when viewed in the drawing. Here, at least one LED 200 may be disposed on each side surface. In addition, the frame 300 provides a space in which the LGP 100 and the LED 200 are disposed. As illustrated in FIG. 3, the frame 300 may be configured to surround entire portions of the LGP 100, except for an area of the LGP 100 through which light is irradiated (i.e. an upper portion in the drawing).

Here, a reflector sheet 400 may be disposed between the rear surface of the LGP 100 and the frame 300 to forwardly reflect light that has exited the rear surface of the LGP 100.

Figure 4:
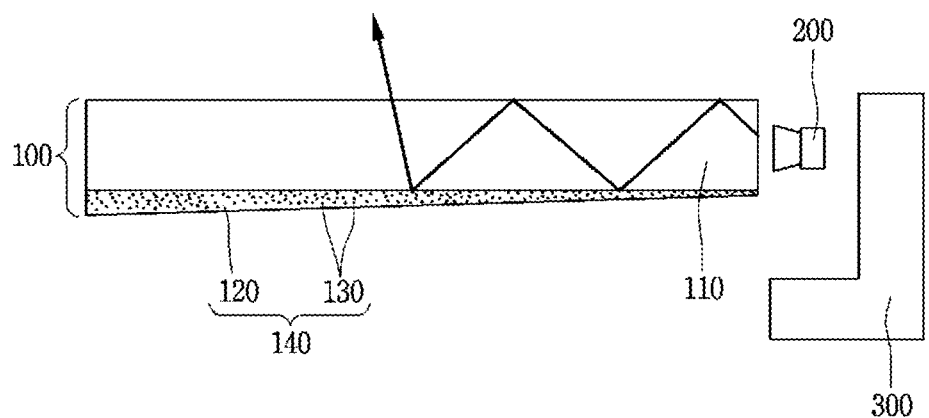

In addition, as illustrated in FIG. 4, the frame 300 may be configured to expose the front and rear surfaces of the LGP 100. That is, the frame 300 in the shape of a rectangular doorframe may be coupled to the LGP 100. In this case, when the LED 200 is on, light is irradiated in opposite directions through the exposed front and rear surfaces of the LGP 100. When the LED 200 is off, the LGP 100 has a hazing value of 30% or less and a transmittance of 50% or more, so that a front observer can see an image behind the illumination device 10 through the transparent LGP 100.

Comparative Example 1

A glass LGP having a size of 120 mm×120 mm×2 mm was prepared. For a light-scattering layer, white ink including, by weight, 12% of $TiO_2$ particles, available from Atech innovations GmbH, was prepared. Here, the white ink was a mixture of hexamethylene diacrylate, exo-1,7,7-trimethylbicyclo[2.2.1]hept-2-yl acrylate, benzyl acrylate, 2-methoxyethyl acrylate, and diphenyl(2,4,6-trimethylbenzoyl) phosphine oxide. A concentration gradient was imparted by performing printing on the LGP such that specific areas of the LGP were unprinted, in a printing density of 400×400 dpi (drops per inch), and by adjusting the size of liquid drops to be 12 pL. According to the concentration gradient, a portion adjacent to the LED was printed at a concentration of 10% (i.e. 400×400×10%=16,000 drops per 1×1 inch), while a portion located farthest from the LED was printed at a concentration of 20%.

Afterwards, two LED bars, respectively provided by connecting twelve LEDs, available from Luminus Inc., in series, were attached to left and right side surfaces of the LGP, and a resultant product was observed, with power of 35 V and 63 mA being supplied thereto. In addition, brightness was measured using a CS-1000 spectroradiometer, available from Minolta Co., Ltd. Consequently, an average front luminance was measured to be 4100 $cd/cm^2$.

Figure 5:
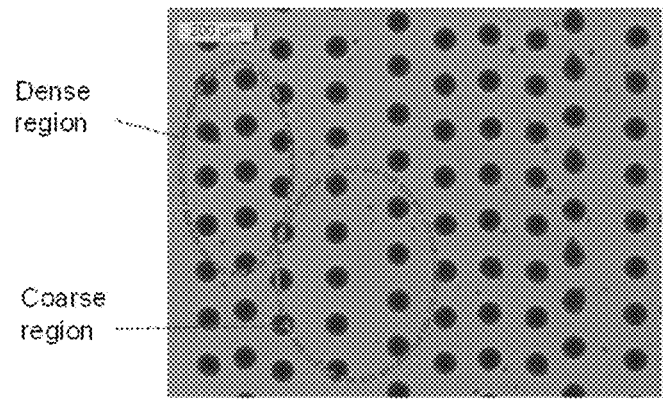
FIG. 5 is an image obtained by observing an LGP fabricated by Comparative Example 1.
Figure 6:
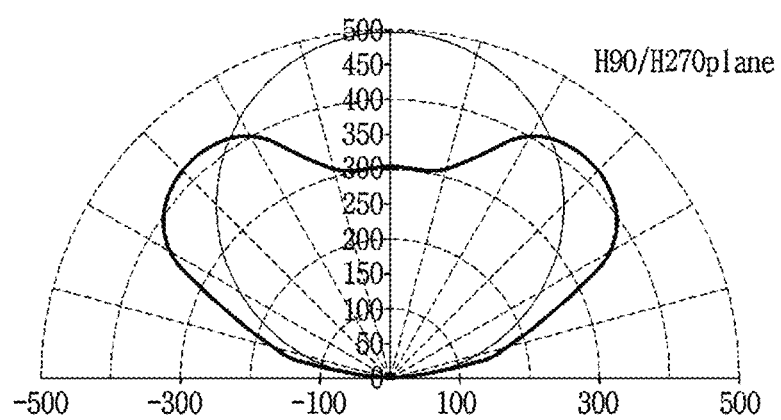
FIG. 6 is a light distribution diagram of an LGP fabricated by Comparative Example 1 of the present disclosure.

Referring to an image in FIG. 5, dots through which light is irradiated were visually recognized. In a plurality of regions, relatively-long distances between dots exceeded 100 Such portions, occurring in irregular positions, were observed as black points. In addition, a stain was caused by a difference between a dense region and a coarse region, due to the problem in the position precision of the printed dots. In addition, as illustrated in a light distribution diagram of FIG. 6, the light distribution was appreciated as being spread significantly in the lateral direction, due to the small thickness of the light-scattering layer, i.e. the printed layer.

Comparative Example 2

Printing was performed at a concentration of 30% in a region adjacent to the LED and a concentration of 60% in a region located farthest from the LED, with the remaining conditions being controlled to be the same as those of Comparative Example 1.

Figure 7:
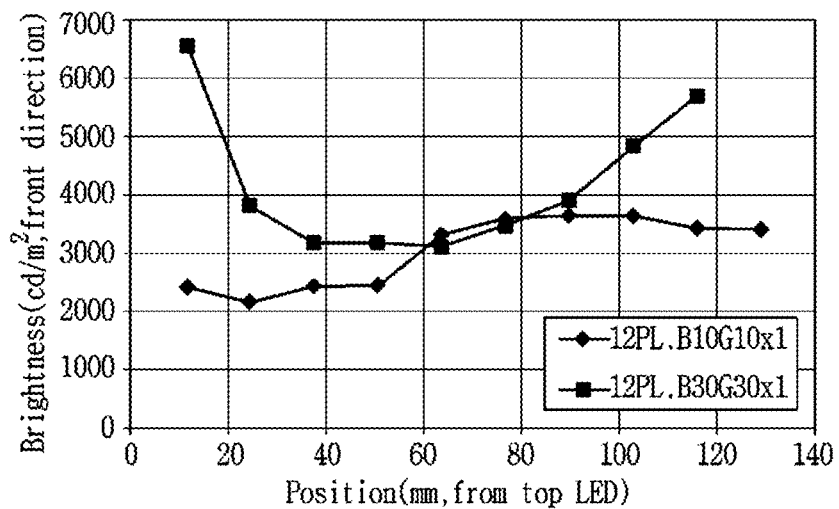
FIG. 7 is a graph illustrating position-specific brightness uniformity depending on the concentration of LGPs fabricated by Comparative Examples 1 and 2 of the present disclosure.

Referring to a graph in FIG. 7 illustrating position-specific brightness uniformity depending on the concentration of the LGPs fabricated by Comparative Examples 1 and 2, it was appreciated that the position-specific brightness of Comparative Example 1 (i.e. a diamond marked curve) had higher uniformity than the position-specific brightness of Comparative Example 2 (i.e. a square marked curve).

Example 1

A plate of Iris™ Glass having a size of 120 mm×120 mm×2 mm, available from Corning Inc., was prepared as an LGP. The Iris™ Glass plate was cut and then cleaned using an inline ultrasonic cleaner. For a light-scattering layer, a solution including, by weight, 2% of $BaTiO_3$ powder, was prepared. A dipropylene glycol methyl ether (DPM) solution was prepared, and the $BaTiO_3$ powder, together with a dispersant, was input to and dispersed in the DPM solution. The resultant solution was mixed with a polysiloxane, so that a final content of the $BaTiO_3$ powder was 0.3% by weight. Afterwards, the mixture solution was printed on the LGP at different printing densities according to areas, with respect to a printing density of 800×800 dpi, by adjusting the size of liquid drops to be 12 pL. Specifically, the printing was performed by imparting a concentration gradient, such that a portion adjacent to the LED was printed with a concentration of 50% (i.e. 800×800×50%=320,000 drops per 1×1 $inch^2$) and a portion farthest from the LED was printed with a concentration of 80% (i.e. 800×800×80%=512,000 drops per 1×1 $inch^2$). A printing map having a printing density in a bitmap format was used. After the printing, the printed layer was cured using an inline curing device. Here, light having an intensity of 1 $J/cm^2$ was irradiated using a metal halide lamp. The number of liquid drops was increased to be about 30 times the number of liquid drops of Comparative Example 1. Consequently, the liquid drops were completely connected to each other, thereby forming a printed surface that was flat and smooth while having a thickness gradient in the printed layer. Here, the smooth surface refers to a glossy flat surface.

Figure 9:
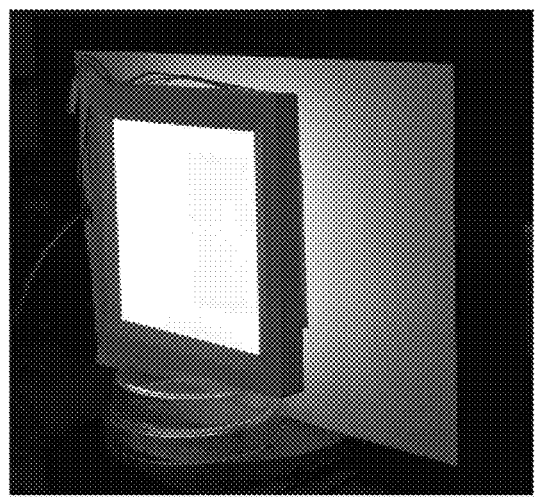
FIGS. 9A and 9B are images illustrating an illumination device in which the LGP fabricated by Example 1 of the present disclosure is used.
Figure 9:
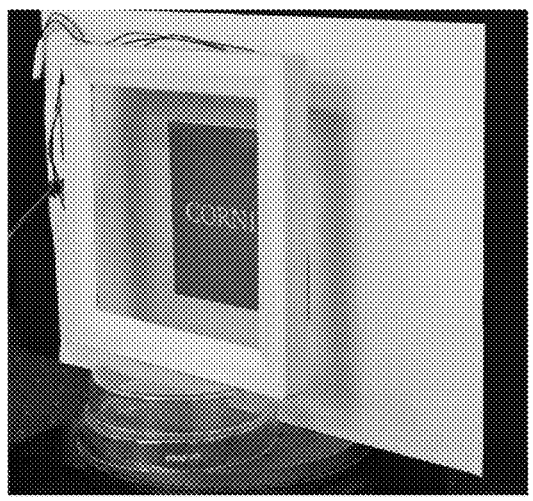
Figure 10:
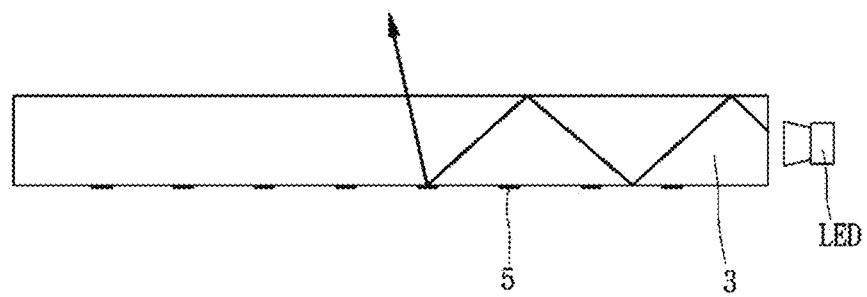
FIGS. 10 and 11 are schematic views illustrating LGPs of the related art.
Figure 11:
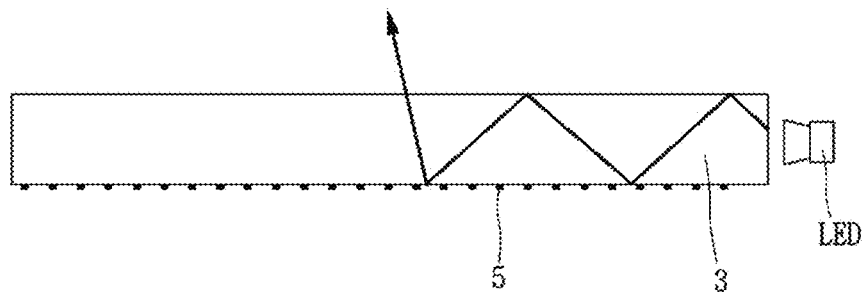

Afterwards, two LED bars, respectively provided by connecting twelve LEDs, available from Luminus Inc., in series, were attached to left and right side surfaces of the LGP, and a resultant product was observed, with power of 39 V and 498 mA being supplied thereto. In addition, brightness was measured using a CS-1000 spectroradiometer, available from Minolta Co., Ltd. Consequently, an average front luminance was measured to be 14740 $cd/cm^2$. Since the dots were connected to each other, neither a stain due to difference printing densities nor a dark point due to the space between the liquid drops was observed. In addition, as illustrated in a light distribution diagram of FIG. 8, light distribution according to the direction of irradiated light was more similar to Lambertian distribution, with increases in the thickness of the light-scattering layer, i.e. the printed layer. As illustrated in images of FIGS. 9A and 9B, when the LEDs were turned off, the transparent LGP and printed layer allowed objects behind the LGP and the printed layer to be visually recognized, thereby providing a transparent illumination device. The transmittance and hazing value of the LGP were 87% and 15% when measured using a BYK-Gardner haze meter, available from BYK-Gardner GmbH.

The foregoing descriptions of specific exemplary embodiments of the present disclosure have been presented with respect to the drawings and are not intended to be exhaustive or to limit the present disclosure to the precise forms disclosed herein, and many modifications and variations would obviously be possible for a person having ordinary skill in the art in light of the above teachings.

It is intended, therefore, that the scope of the present disclosure not be limited to the foregoing embodiments, but be defined by the Claims appended hereto and their equivalents.

What is claimed is:

1. A transparent light guide plate comprising:
   a light guide plate body comprising a first surface facing a front observer and through which light is irradiated, a second surface opposite to the first surface, and a third surface connected to a peripheral portion of the first surface and a peripheral portion of the second surface to connect the first surface and the second surface, the third surface facing a light-emitting diode; and a light-scattering layer fabricated on an overall area of the second surface, the light-scattering layer comprising a matrix layer and a number of light-scattering particles dispersed in the matrix layer wherein the light-scattering particles have a different refractive index than the matrix layer, wherein number of the light-scattering particles per unit area vary by at least 1.2 times from a position located adjacent to the light-emitting diode and a position farthest from the light-emitting diode, wherein a dispersion density of the number of light scattering particles and a thickness of the light-scattering layer gradually increase with increases in a distance from the light-emitting diode facing at least one surface of the third surface, wherein the light guide plate has a hazing value of 30% or less and a transmittance of 50% or more, wherein a surface roughness of the light-scattering layer is 100 nm or less.

2. The light guide plate of claim 1, wherein thicknesses of the light-scattering layer range from 1 μm to 5 μm.

3. The light guide plate of claim 1, wherein the light-scattering particles are formed from a material having a higher refractive index than that of the matrix layer.

4. The light guide plate of claim 3, wherein the light-scattering particles comprise at least one selected from among $TiO_2$, $ZrO_2$, $BaTiO_3$, and $SnO_2$.

5. An illumination device comprising:
the light guide plate as claimed in claim 1;
at least one light-emitting diode disposed to face at least one surface of the third surface defined as a side surface of the light guide plate; and
a frame providing a space in which the light guide plate and the light-emitting diode are disposed.

6. The illumination device of claim 5, wherein, when the light-emitting diode is on, light is irradiated through the first surface defined as a front surface of the light guide plate and the second surface defined as a rear surface of the light guide plate, and
when the light-emitting diode is off, the front observer facing the first surface is able to observe the second surface through the light guide plate.

7. The illumination device of claim 5, further comprising a reflector disposed adjacent to the second surface defined as a rear surface of the light guide plate.

8. The light guide plate of claim 1, wherein the light-scattering particles are applied in a printing solution at a range of from 0.1% to 5% by weight.

9. The light guide plate of claim 1, wherein numbers of the light-scattering particles dispersed within a portion of the light-scattering layer located adjacent to the light-emitting diode is about 30% to about 50% of a printing density while the light-scattering particles dispersed within a portion of the light-scattering layer farthest from the light-emitting diode is about 60% to about 80% of the printing density.

10. The light guide plate of claim 1, wherein numbers of the light-scattering particles dispersed within a portion of the light-scattering layer located adjacent to the light-emitting diode is greater than or equal to about 50% of a printing density while the light-scattering particles dispersed within a portion of the light-scattering layer farthest from the light-emitting diode is greater than or equal to about 80% of the printing density.

11. The light guide plate of claim 1, wherein light distribution out of the light guide plate is a Lambertian distribution.

12. A transparent light guide plate comprising:
a light guide plate body comprising a first surface facing a front observer and through which light is irradiated, a second surface opposite to the first surface, and a third surface connected to a peripheral portion of the first surface and a peripheral portion of the second surface to connect the first surface and the second surface, the third surface facing a light-emitting diode; and
a light-scattering layer fabricated on an overall area of the second surface, the light-scattering layer comprising a matrix layer and a number of light-scattering particles dispersed in the matrix layer wherein the light-scattering particles have a different refractive index than the matrix layer,
wherein a dispersion density of the number of light-scattering particles and a thickness of the light-scattering layer gradually increase with increases in a distance from the light-emitting diode facing at least one surface of the third surface,
wherein the thickness of the light-scattering layer increases in a Gaussian distribution,
wherein the light guide plate has a hazing value of 30% or less and a transmittance of 50% or more,
wherein a surface roughness of the light-scattering layer is 100 nm or less.

13. The light guide plate of claim 12, wherein thicknesses of the light-scattering layer range from 1 μm to 5 μm.

14. The light guide plate of claim 12, wherein the light-scattering particles are formed from a material having a higher refractive index than that of the matrix layer.

15. The light guide plate of claim 14, wherein the light-scattering particles comprise at least one selected from among $TiO_2$, $ZrO_2$, $BaTiO_3$, and $SnO_2$.

16. An illumination device comprising:
the light guide plate as claimed in claim 12;
at least one light-emitting diode disposed to face at least one surface of the third surface defined as a side surface of the light guide plate; and
a frame providing a space in which the light guide plate and the light-emitting diode are disposed.

17. The illumination device of claim 16, wherein, when the light-emitting diode is on, light is irradiated through the first surface defined as a front surface of the light guide plate and the second surface defined as a rear surface of the light guide plate, and
when the light-emitting diode is off, the front observer facing the first surface is able to observe the second surface through the light guide plate.

18. The illumination device of claim 16, further comprising a reflector disposed adjacent to the second surface defined as a rear surface of the light guide plate.

19. The light guide plate of claim 12, wherein the light-scattering particles are applied in a printing solution at a range of from 0.1% to 5% by weight.

20. The light guide plate of claim 12, wherein light distribution out of the light guide plate is a Lambertian distribution.

* * * * *

UNITED STATES PATENT AND TRADEMARK OFFICE
CERTIFICATE OF CORRECTION

PATENT NO. : 11,112,559 B2  
APPLICATION NO. : 16/374381  
DATED : September 7, 2021  
INVENTOR(S) : Kim et al.

Page 1 of 1

It is certified that error appears in the above-identified patent and that said Letters Patent is hereby corrected as shown below:

In the Claims

In Column 12, Lines 4-5, Claim 11, delete "light distribution out" and insert -- light distribution is out --, therefor.

In Column 12, Lines 60-61, Claim 20, delete "light distribution out" and insert -- light distribution is out --, therefor.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*